(12) United States Patent
Yamamoto et al.

(10) Patent No.: US 8,818,443 B2
(45) Date of Patent: Aug. 26, 2014

(54) BASE STATION AND CELLULAR WIRELESS COMMUNICATION SYSTEM

(75) Inventors: Tomonori Yamamoto, Fujisawa (JP); Rintaro Katayama, Fujisawa (JP); Hirotake Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 456 days.

(21) Appl. No.: 13/166,084

(22) Filed: Jun. 22, 2011

(65) Prior Publication Data
US 2012/0028630 A1 Feb. 2, 2012

(30) Foreign Application Priority Data

Jul. 29, 2010 (JP) ................................. 2010-170242

(51) Int. Cl.

| H04B 1/00 | (2006.01) |
|---|---|
| H04B 15/00 | (2006.01) |
| H04W 72/00 | (2009.01) |
| H04B 7/00 | (2006.01) |
| H04B 7/185 | (2006.01) |
| H04B 7/204 | (2006.01) |
| H04B 7/216 | (2006.01) |
| H04K 1/10 | (2006.01) |
| H04L 27/28 | (2006.01) |
| H04L 27/00 | (2006.01) |
| H04L 27/06 | (2006.01) |

(52) U.S. Cl.
USPC .......... 455/522; 455/63.1; 455/450; 455/501; 370/318; 370/319; 370/335; 375/260; 375/295; 375/340

(58) Field of Classification Search
USPC ........ 455/13.4, 63.1, 69, 127.1, 127.2, 127.5, 455/134, 404.2, 418, 419, 420, 435.3, 450, 455/451, 452.1, 452.2, 513, 515, 517, 522, 455/562.1, 572, 574; 370/252, 278, 280, 370/282, 311, 315, 318, 319, 328, 329, 331, 370/332, 335, 336, 337, 350, 342; 375/141, 375/260, 267, 295, 296, 335, 340, 341, 346, 375/347

See application file for complete search history.

(56) References Cited

U.S. PATENT DOCUMENTS

| 2005/0009532 A1* | 1/2005 | Cuffaro et al. ............. 455/452.2 |
| 2006/0094363 A1* | 5/2006 | Kang et al. .................. 455/63.1 |

(Continued)

FOREIGN PATENT DOCUMENTS

| CN | 101127540 A | 2/2008 |
| CN | 101485115 A | 7/2009 |

(Continued)

OTHER PUBLICATIONS

3rd Generation Partnership Project; Technical Specification Group Radio Access Network; Evolved Universal Terrestrial Radio Access (E-UTRA); Physical Layer Procedures (Release 9), 3GPP TS 36.213, V9.1.0, Technical Specification (Three (3) pages).

(Continued)

*Primary Examiner* — Yuwen Pan
*Assistant Examiner* — Paul P Tran
(74) *Attorney, Agent, or Firm* — Crowell & Moring LLP

(57) ABSTRACT

A femtocell base station collects the terminal distribution within the cell and selects terminals to represent the cell-center and the cell-edge from among the terminals within the cell. The femtocell base station also calculates maximum transmit power for the respective cell-center and cell-edge terminals allowable by the macrocell base station. The femtocell base station sets the respective transmit power of the cell-center and the cell-edge in a range that will not exceed the maximum transmit power, adjusts the transmit power control parameter to allow control by the terminal at the power value that was set, and notifies the terminal. Communication with high throughput can in this way be attained for terminals in cells within the femtocell base station during uplink communications to the femtocell base station, and interference applied to the terminals in the macrocell base station can be suppressed.

15 Claims, 10 Drawing Sheets

(56) References Cited

U.S. PATENT DOCUMENTS

| | | | |
|---|---|---|---|
| 2006/0209767 A1* | 9/2006 | Chae et al. | 370/335 |
| 2007/0177501 A1* | 8/2007 | Papasakellariou | 370/229 |
| 2008/0008113 A1* | 1/2008 | Cho et al. | 370/318 |
| 2008/0146154 A1 | 6/2008 | Claussen et al. | |
| 2008/0166976 A1 | 7/2008 | Rao | |
| 2009/0092086 A1* | 4/2009 | Lee et al. | 370/329 |
| 2009/0124261 A1* | 5/2009 | Shimomura | 455/436 |
| 2009/0185577 A1* | 7/2009 | Kishiyama et al. | 370/465 |
| 2009/0291691 A1* | 11/2009 | Jeong et al. | 455/450 |
| 2010/0085924 A1* | 4/2010 | Hamabe et al. | 370/329 |
| 2011/0045831 A1* | 2/2011 | Chiu et al. | 455/436 |

FOREIGN PATENT DOCUMENTS

| | | |
|---|---|---|
| CN | 101574000 A | 11/2009 |
| JP | 2010-512680 A | 4/2010 |
| JP | 2010-516184 A | 5/2010 |

OTHER PUBLICATIONS

Chinese Office Action dated Apr. 14, 2014 11 pages.

* cited by examiner

| Received Power Report Table ||||
|---|---|---|---|
| Home UE# | HeNB | MeNB#1 | MeNB#2 |
| 1 | 80 | 70 | 50 |
| 2 | 75 | 50 | 70 |
| 3 | 90 | 60 | 60 |

4011

| MCS# | Modulation | Code Rate | Target Power | Target SNR |
|---|---|---|---|---|
| 0 | -- | -- | -- | -- |
| 1 | QPSK | 0.12 | -79 | -6.0 |
| 2 | QPSK | 0.15 | -78 | -5.0 |
| 3 | QPSK | 0.18 | -76 | -3.0 |
| .. | .. | .. | .. | .. |
| 28 | 64QAM | 0.91 | -50 | 23.0 |

BASE STATION AND CELLULAR WIRELESS COMMUNICATION SYSTEM

CLAIM OF PRIORITY

The present application claims priority from Japanese patent application JP 2010-170242 filed on Jul. 29, 2010, the content of which is hereby incorporated by reference into this application.

FIELD OF THE INVENTION

The present invention relates to a base station and a cellular wireless communication system, and relates in particular to a base station and a cellular wireless communication system that makes uplink transmit power control settings while taking the applied interference into account. The present invention also relates to power control of terminals by base stations in cellular wireless communication system utilizing the orthogonal frequency division multiple access system (OFDMA).

BACKGROUND OF THE INVENTION

A typical configuration for a cellular wireless system is first of all described.

Cellular wireless communication systems are comprised of communication areas called cells which are base stations {sometimes referred to as eNB (e-UTRA Node B)} that cover a particular communication area.

These base stations have different names such as macrocell base stations (MeNB), picocell base stations, and femtocell base stations (HeNB: Home eNB), according to the width, and function of their area. The cellular wireless base station having the largest area is called the macrocell base station which contains terminals (sometimes referred to as UE or User Equipment) within a range from a few hundred to a few thousand meters.

In communication links that couple the base station to the terminal in wireless communication systems, the interference power generated from the neighboring cell base station in the downlink and the interference power from the terminals belonging to the neighboring cell base station in the uplink are known to exert effects on the quality of the communication link. At the cell-edge which is the boundary of the area covered by a base station, the desired signal from that base station's own cell must compete with interference power generated from adjacent cells. This interference power causes the SINR (Signal to Interference and Noise Power Ratio) which is an index for expressing received power quality to deteriorate and appears as a drastic drop in communication speed. Lowering the interference from adjacent cells is therefore an essential element in improving the overall system in terms of channel capacity during wireless access.

Transmit power control at the terminal during the uplink operation during wireless access is also closely involved with interference control. This relation is described using FIG. 13. The terminal 13-A in the figure must transmit at high power to overcome the path loss generated between itself and the serving cell base station 11-A (base station to which terminal 13-A belongs) and attain the desired signal (solid line arrows in the figure) at the specified communication quality. However, the high power at which the terminal 13-A transmits arrives at the neighboring cell base station 11-B (broken line arrows in the figure) as interference power which is a large interference power at the terminal 13-B that is connected to the neighboring cell base station 11-B. Conversely, the power from the transmission by the terminal 13-B arrives at the base station 11-A as interference power in the same way and acts as interference power on the terminal 13-A connected to the base station 11-A.

SUMMARY OF THE INVENTION

The 3rd Generation Partnership Project or 3GPP which is the Standards Development Organization (SDO) is working to establish standards for OFDMA type wireless communication systems called LTE (Long Term Evolution). The transmit power control for the LTE uplink shared (PUSCH: Physical Uplink Shared Channel) is expressed by the following formula as defined in 3GPP TS36.213, "Physical layer: procedures", v 9.1.0, March 2010.

$$P_{PUSCH}(i) = \min\{P_{MAX}, 10 \log_{10}(M_{PUSCH}(i)) + P_{0\_PUSCH} + \alpha \cdot PL + \Delta_{TF}(i) + f(i)\} \quad \text{[Formula 1]}$$

The base station 11 notifies all the terminals 13 belonging to its own cell of control parameters except for PL (Pathloss). The terminal 13 decides the transmit power utilizing the measured PL and the notified parameter. Each parameter is described later on (See 3GPP TS36.213, "Physical layer: procedures", v 9.1.0, March 2010 for more detailed information.)

FIG. 14 shows a concept view of the control scheme. The vertical axis is the transmit power. The horizontal axis is the PL between the base station 11 and the terminal 13. The communication quality deteriorates as the PL becomes larger so the terminal 13 must increase the transmit power in order to compensate for the PL. The $\alpha$ or alpha in the formula is a predetermined coefficient for compensating the PL. In this control scheme the PL is fully compensated when the $\alpha=1.0$, and the received power at the base station (or eNB) is ideally regulated to a specified value. However when the $\alpha$ falls below 1.0 the PL is not fully compensated, and the base station does not maintain the received power at an equal amount among the terminals. When the $\alpha$ equals 0 then the path loss is no longer compensated so transmit power control that is largely dependent on the base power $P_{0\_PUSCH}$ is implemented. This scheme is sometimes called the fractional power control equation.

In base stations such as the macrocell base station where deployment over a wide coverage area is essential, the terminal transmit power at the cell-center is set by adjusting the $\alpha$ after determining the transmit power for maintaining communication quality at the cell-edge.

The technology in Japanese Unexamined Patent Application Publication (Translation of PCT Application) No. 2010-516184 for example discusses a method for setting the uplink target received power quality so as to allow communications within the cell itself, and then raising the uplink target received power quality of the cell-center terminal. This power control method takes the applied interference into account however the terminal itself regulates the transmit power by correcting the target SINR. However this method does not always take into account the extent of interference that adjacent cells apply to each other when this method cannot be applied to all terminals. Here, the base station should preferably provide fixed rules to terminals under its control as broadcast information from the base station.

The femtocell base station installed with the objective of covering hotspots after the macrocell base station was installed, must fulfill the dual tasks of minimizing interference applied to the macrocell base station and achieving high communication throughput with the femtocell base station.

Implementing terminal transmit power control to compensate for the path loss in the femtocell during uplink communication from the terminal to the femtocell base station, achieves high communication throughput at the terminals within the femtocell base station but also increases the applied interference at terminals within the macrocell base station.

In view of the above mentioned problems with the related art, the present invention has the objective of providing a base station for wireless communication systems that controls the transmit power in terminals while both reducing the interference applied to neighboring cells and attaining high communication quality in its own cell during the uplink.

To achieve this objective the present invention controls parameters for uplink transmit power control according to the distribution of terminals within the cell of the femtocell base station.

The femtocell base station collects the terminal distribution within the cell, and selects terminals to represent the cell-center and cell-edge from the terminals within the cell. The femtocell base station further calculates the maximum allowed transmit power of the macrocell for the respective cell-center and the cell-edge terminals within the macrocell. The femtocell base station sets a respective transmit power for the cell-center and the cell-edge that does not exceed the range of the maximum transmit power, adjusts the transmit power control parameters to allow limiting the terminal to the power value that was set, and notifies the terminal.

A first aspect of the present invention to resolve the above problems provides a base station for a cellular wireless communication system comprised of a plurality of base stations and terminals for controlling the transmit power based on specified transmit power control parameters and the path loss with the base station carrying out communication;

in which the base station:

receives from each terminal, the received power quality information of the downlink reference signal from its own base station that was measured by the plural terminals; and the received power quality information of the downlink reference signal from an neighboring cell base station that is adjacent to its own base station;

selects a cell-center terminal and a cell-edge terminal from the plural terminals based on the applicable received power quality information and;

finds the first transmit power of the cell-center terminal based on the allowed interference power quantity preset in the neighboring cell base station, and the first path loss between the applicable neighboring cell base station and the cell-center terminal;

finds the second transmit power of the cell-edge terminals based on the allowed interference power quantity preset in the neighboring cell base station; and the second path loss between the applicable neighboring cell base station and the cell-edge terminal;

specifies the relation between path loss and transmit power by interpolating the first path loss and the first transmit power of the cell-center terminal, and the second path loss and the second transmit power of the cell-edge terminal, and also finds the transmit power control parameters utilized in controlling the transmit power in the terminals belonging to its own base station; and notifies the terminals belonging to its own base station of the transmit power control parameters that were found.

A second aspect of the present invention to resolve the above problems provides a cellular wireless transmission system comprising a first base station for communicating with a plurality of terminals, and a second base station adjacent to the applicable first base station, and the cellular wireless communication system controls the transmit power based on the specified transmit power control parameters and path loss in communication between the base station and the terminals;

in which the first base station:

receives from each terminal, the received power quality information of the downlink reference signal from the first base station measured by the plural terminals; and the received power quality information of the downlink reference signal from the second base station;

selects a cell-center terminal and a cell-edge terminal from the plural terminals based on the applicable received power quality information and;

finds the first transmit power of the cell-center terminal based on the allowed interference power quantity preset in the second base station, and the first path loss between the second base station and the cell-center terminal;

finds the second transmit power of the cell-edge terminal based on the allowed interference power quantity preset in the second base station; and the second path loss between the second base station and the cell-edge terminal;

specifies the relation between path loss and transmit power by interpolating the first path loss and the first transmit power of the cell-center terminal, and the second path loss and the second transmit power of the cell-edge terminal, and also finds the transmit power control parameters utilized in controlling the transmit power in the terminals belonging to its own base station; and notifies the terminals belonging to its own base station of the transmit power control parameters that were found.

The present invention is capable of providing control of transmit power in terminals while both minimizing the interference applied to neighboring cells and attaining high communication quality in its own cell during the uplink. The present invention can for example be effectively applied to femtocell base stations.

The improved easy installation of femtocell base stations has made hotspot installation simpler in cellular wireless communication systems, which is beneficial in terms of minimizing effects on the macrocell base station.

DETAILED DESCRIPTION OF THE PREFERRED EMBODIMENTS

Figure 1:
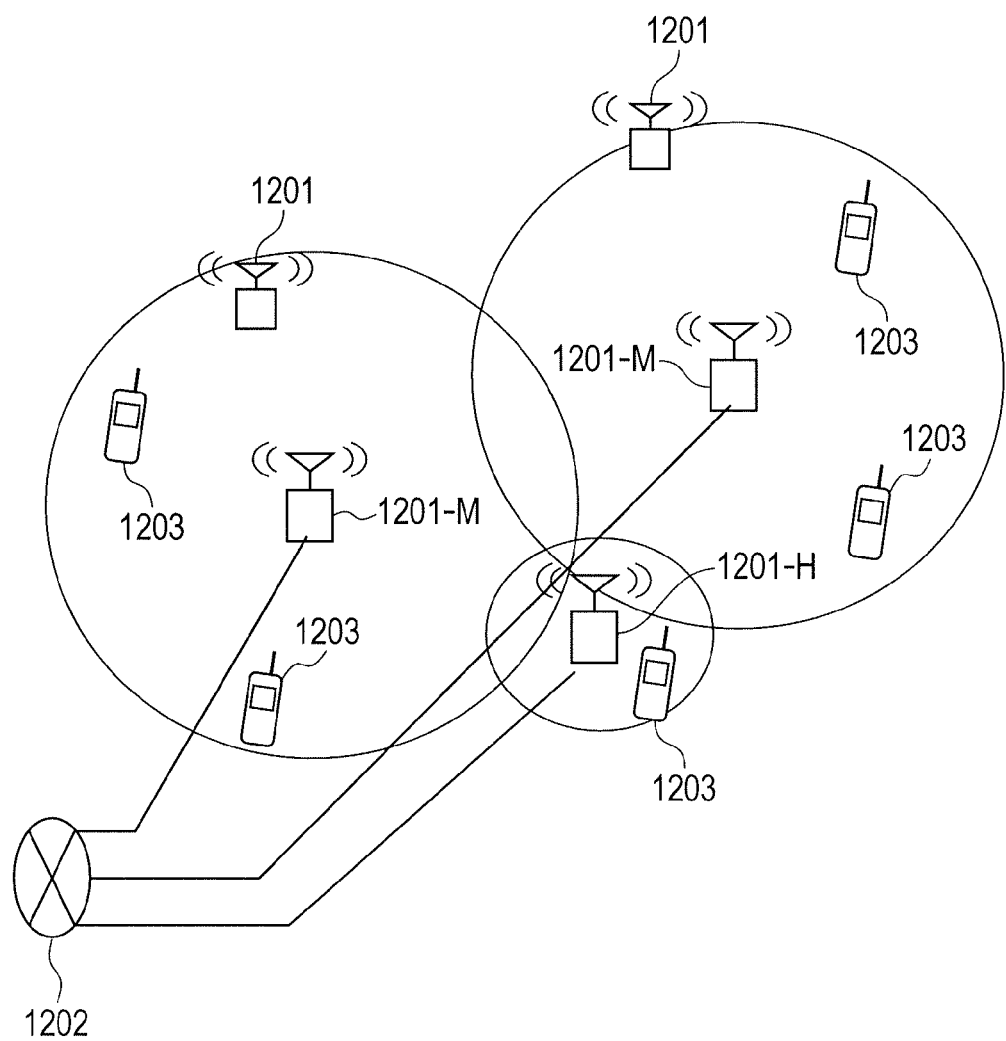
FIG. 1 is a diagram of the overall configuration of the cellular wireless communication system of the present invention.

A number of embodiments of the present invention are described next while referring to examples. These embodiments were implemented separately but may be implemented in combinations. In the following description, the same reference numerals are assigned to the same structural members in the drawings when implementing the same operation and redundant descriptions are omitted in such cases.

A base station considered here as exerting interference can for example be the femtocell base station. The femtocell base station in the following embodiment is therefore a conceptual base station that includes the typical femtocell base station category called ultra-small base stations that are connected to an IP network. Conversely, a base station such as macrocell base station may be considered here as a base station affected by applied interference. The macrocell base station is considered here as a base station within the scope of a typical macrocell base station the same as for femtocell base stations but is not limited to such base stations.

First Embodiment

FIG. 1 describes the overall configuration of the cellular wireless communication system of the present embodiment.

The cellular wireless communication system of the present embodiment is comprised for example the macrocell base stations 1201-M and the femtocell base station 1201-H. The terminal 1203 can communicate with the macrocell base stations 1201-M and the femtocell base station 1201-H.

The base station 1201 provides communication among terminals 1203 located at separate positions, and data communication services between terminals and contents providers through a core network 1202 configured from host devices such as element management servers, mobility management elements, and gateways. Even among base stations however, the femtocell base station connects to the core network 1202 via ISP (Internet Service Provider) network.

Figure 2:
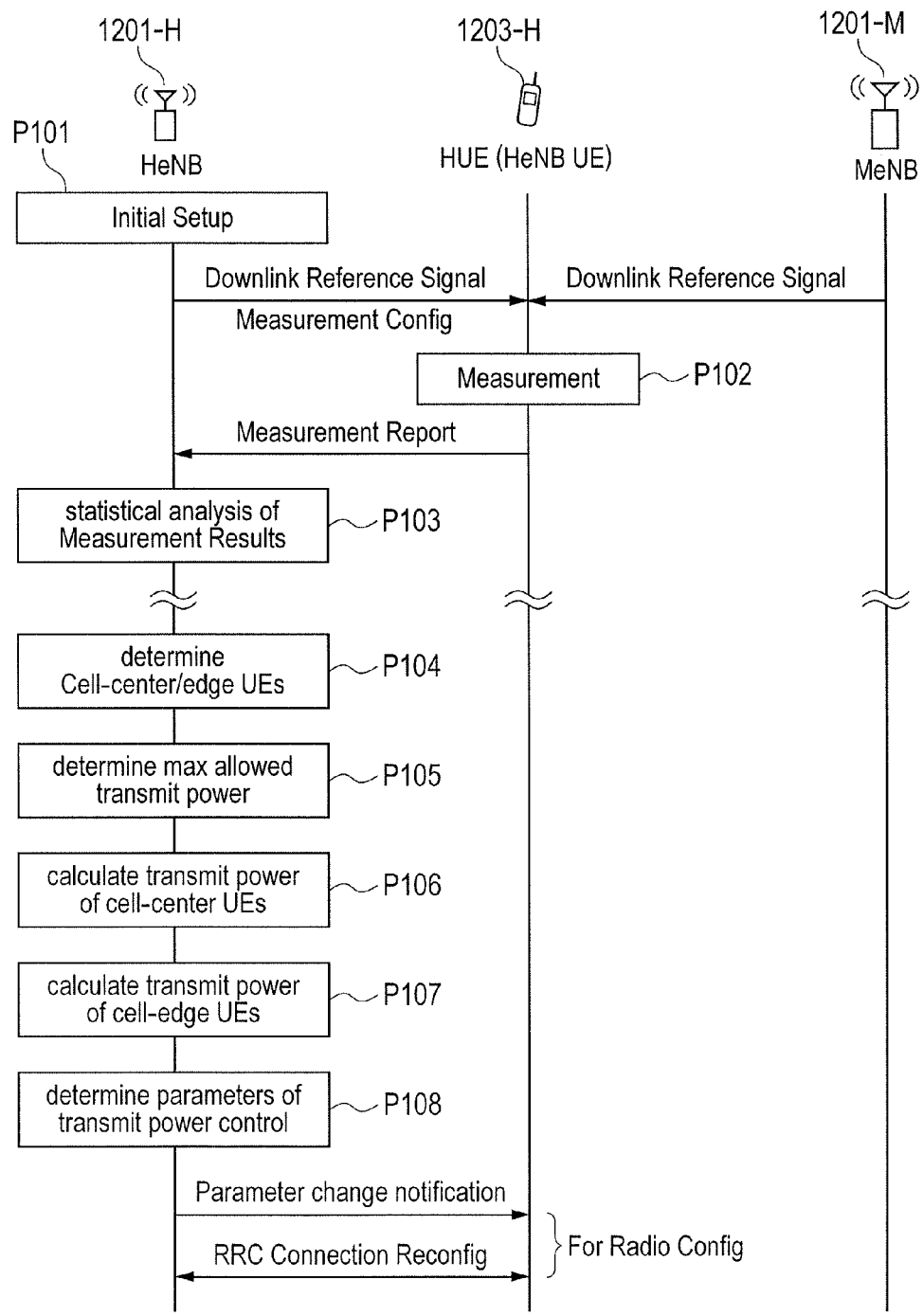
FIG. 2 is a drawing showing the operating sequence of the present invention.

The operation of the present embodiment is described next utilizing the sequence shown in FIG. 2.

The femtocell base station 1201-H sets the transmit power control parameters according to the initial setups P101 after startup. The parameters set in the initial setup P101 may even be pre-installed parameters or may be parameters set by an OAM device.

The terminal 1203-H connected to the femtocell base station 1201-H receives the downlink reference signal sent by the macrocell base station 1201-M, and measures the downlink signal quality (for example the received power) (P102). One macrocell base station is displayed in the drawing however the downlink signals from a plurality of macrocell base stations may be received and respectively measured. The femtocell base station 1201-H may then notify the measurement configuration to the terminal 1203-H. The terminal 1203-H may report (measurement report) the downlink received power quality measured on the reference signals sent from the femtocell base station 1201-H and from the macrocell base station 1201-M, to the femtocell base station 1201-H functioning as the serving cell.

The femtocell base station 1201-H calculates statistical information based on the measurement report from the terminals 1203-H, where the measurement report includes the received power information of serving cell and also that of neighboring cells (P103). The femtocell base station 1201-H selects the cell-center terminal and the cell-edge terminal (P104) from information in the control table acquired in P103. The femtocell base station 1201-H also determines the respective "maximum allowed transmit power" (P105) for the cell-center terminal and the cell-edge terminal that were set in P104. In P106, the femtocell base station 1201-H calculates the transmit power based on the modulation method scheduled for use in the terminals and the maximum allowed transmit power in the terminal of cell-center terminal. In P107, the femtocell base station 1201-H calculates the transmit power for the cell-edge terminal and the scheduled modulation method for use in the terminals in the same way. In P108, the femtocell base station 1201-H determines the transmit power control parameters for all terminals within the cell, utilizing the cell-edge terminal transmit power and the cell-center terminal power. All terminals are notified of the parameters that were set and the terminals execute open-loop power control. The above process provides high throughput communications that take the applied interference into account. These steps P103 through P108 are described next in detail.

Figure 3:
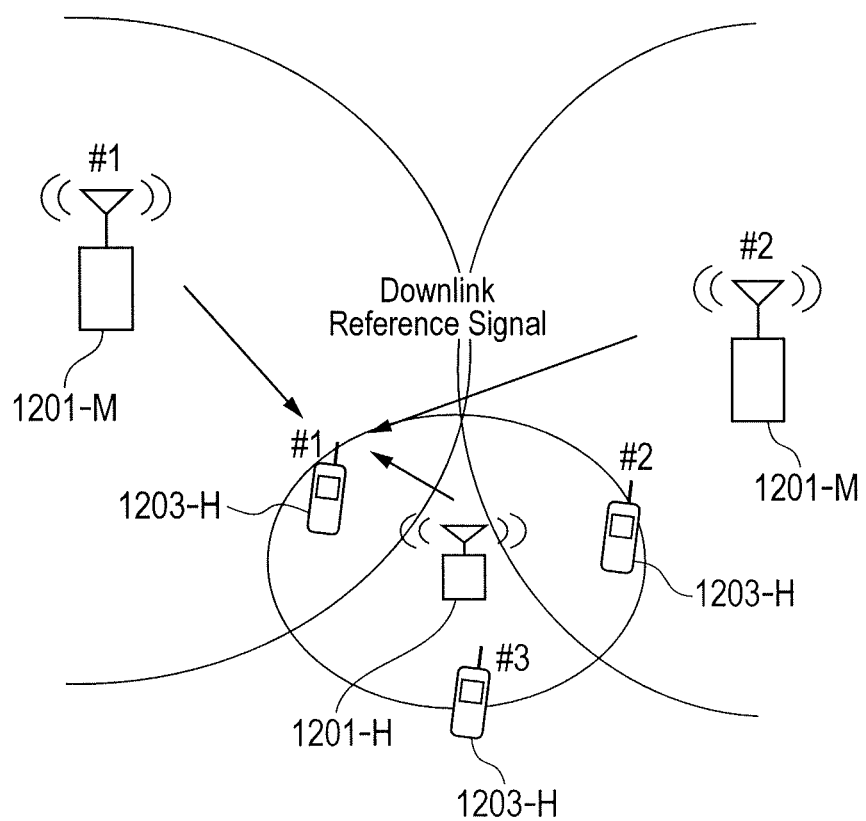
FIG. 3 is a concept drawing for describing a typical installation of the femtocell base station and the macrocell base station.
Figures 4, 5:
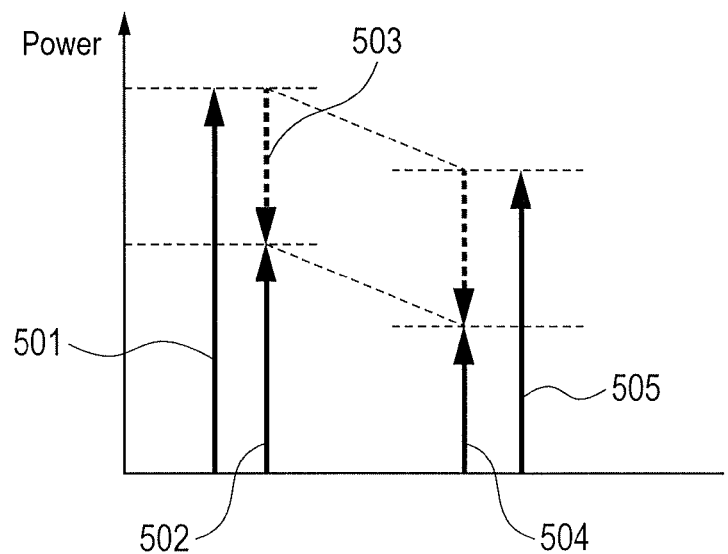
FIG. 4 is a drawing showing the received power report table and corresponding cell managed by the femtocell base station.
FIG. 5 is a drawing showing a method for calculating the allowed maximum power.

Step P103 is first of all described next while referring to FIG. 3. In this case, the femtocell base station 1201-H and the macrocell base stations 1201-M (#1, #2) are installed in the system. The terminals 1203-H connected to the femtocell base stations, measure the downlink reference signal from the macrocell base stations 1201-M (#1, #2). The terminals 1203-H respectively report the measurement results to the femtocell base station 1201-H. The femtocell base station 1201-H stores the reported measurement results in a received power report table 4011 such as shown in FIG. 4. As shown in the figure, the received power report table 4011 for example retains each base station ID (identifier) and received power information as a set along with each terminal ID. The values stored in the received power report table 4011 may even be instantaneous values or statistical values (e.g. mean values or reported frequency, etc.). The femtocell base station 1201-H updates the information in the received power report table 4011 each time a report arrives from the terminals.

The method for selecting the cell-center terminal and the cell-edge terminal in P104 is described next. The method for selecting the cell-center terminal is considered first. One method for selecting the cell-center terminal for example is selecting one terminal meeting the condition that the received power from the femtocell base station 1201-H is the same or higher than a preset threshold value for received power from the macrocell base stations 1201-M. Another method is setting a received power from the macrocell base stations 1201-M that is a certain threshold value or lower as a judgment criteria and then selecting a terminal that satisfies that judgment criteria.

The method for selecting the cell-edge terminal may for example select one terminal from satisfying the condition that the received power from the macrocell base stations 1201-M is the same or higher than a preset threshold value for the received power from the femtocell base station 1201-H. Another method may for example select one cell-edge terminal from among terminals satisfying the condition that the difference in received power from the femtocell base station 1201-H and the received power from the macrocell base stations 1201-M is the same or lower than a preset threshold value. The cell-center and the cell-edge may here be defined in terms of the size of the path loss rather the physical distance from the femtocell. The terminal where the received power from the femtocell base station 1201-H is a maximum may be defined as the cell-center terminal, and the terminal where the received power is minimum may be defined as the cell-edge terminal.

In the numerical values shown in FIG. 4 for example, the terminal #3 was selected as the cell-center terminal, and the terminal #2 was selected as the cell-edge terminal.

The method for calculating the maximum allowed transmit power in P105 is described next while referring to FIG. 5 and FIG. 6.

The femtocell base station 1201-H calculates the path loss 503 between the terminals 1203-H and the macrocell base stations 1201-M from the downlink transmit power 501 sent from the macrocell base stations 1201-M, and from the downlink received power 502 from the macrocell base stations 1201-M that was received and measured by the terminals 1203-H. The downlink transmit power from the macrocell base station can be acquired as needed as described later on. The maximum allowed transmit power 505 sent by the femtocell base station 1201-H can be calculated by obtaining the difference sum of each absolute value) between the pathloss 503 that was found, and the allowed interference power quantity 504 received by the macrocell base stations 1201-M.

Figure 6:
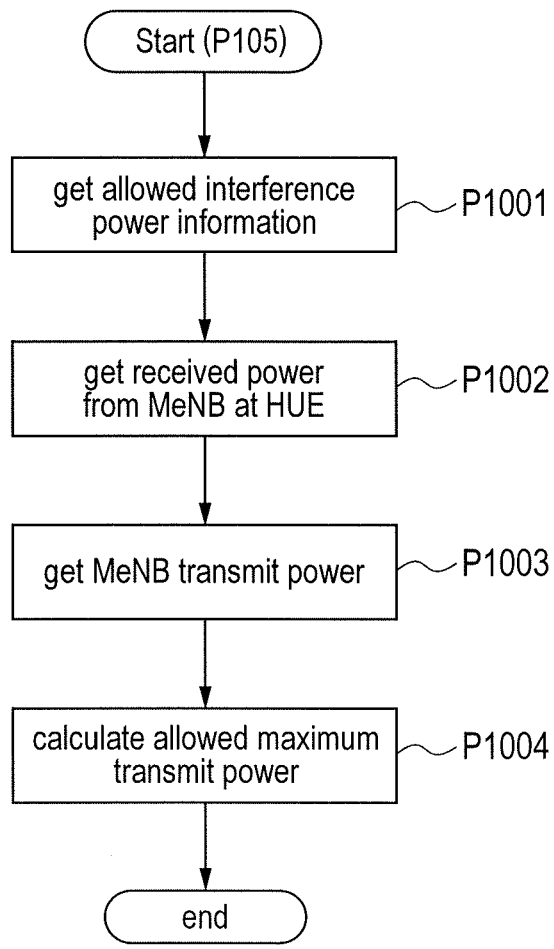
FIG. 6 is a flow chart showing in detail the procedure for calculating the allowed maximum power.

The femtocell base station 1201-H execute step P105 in the detailed procedure shown in FIG. 6. In P1001, the femtocell base station 1201-H collects information on the allowed interference power quantity 504. This allowed interference power quantity 504 may even be a value found from the receive sensitivity of the macrocell base stations 1201-M. Power that is lower than the receive sensitivity cannot be distinguished from noise and so can be treated as power at a level that can be ignored. An interference power quantity 504 allowable at the macrocell base stations 1201-M as part of the system design may also be set as a system parameter. In this case the OAM device may set an allowed interference power (or receive sensitivity) in the femtocell base station 1201-H, or may provide an initial setup for the femtocell base station 1201-H. In P1002, the femtocell base station 1201-H estimates the downlink received power 502 from the macrocell base stations 1201-M measured by the terminals 1203-H. To make this estimation, the femtocell base station 1201-H may utilize the value for the received power information report table 4011 that was used to sort the cell-center terminals and the cell-edge terminals. In P1003, the femtocell base station 1201-H collects the downlink transmit power information 501 from the macrocell base stations 1201-M. A variety of methods may be considered for the collection method. Methods for collection from the backhaul line may include exchange of downlink transmit power information between each of the base stations or instructions sent from the OAM device. The femtocell base station 1201-H may receive macrocell base station 1201-M information and control channels if they contain a function for receiving information from terminals. If these channels can be received then macrocell base station transmit power can be directly obtained. Alternatively, the path loss may be reported when the terminals report the received power quality from neighboring cells.

In P1004, the femtocell base station 1201-H calculates the maximum allowed transmit power 505. The pathloss 503 between the terminals 1203-H and the macrocell base stations 1201-M can be calculated from the difference between the information 501 and 502 collected in P1002 and P1003. Moreover, the maximum allowed transmit power 505 can be calculated if the sum of the absolute values for the pathloss 503 and the allowed interference power quantity 504 can be obtained. The interference power is a large limiting condition when calculating the maximum allowed transmit power 505 for both the cell-edge terminal and cell-center terminal. Compared to the cell-center terminal, the cell-edge terminal causes a relatively larger interference power to the macrocell base station 1201-M. In other words, the cell-edge terminal tends to have a maximum allowed transmit power 505 that is smaller than the cell-center terminal. The femtocell base station 1201-H stores the maximum allowed transmit power for the cell-edge terminal and the maximum allowed transmit power for the cell-center terminal as needed.

Figure 7:
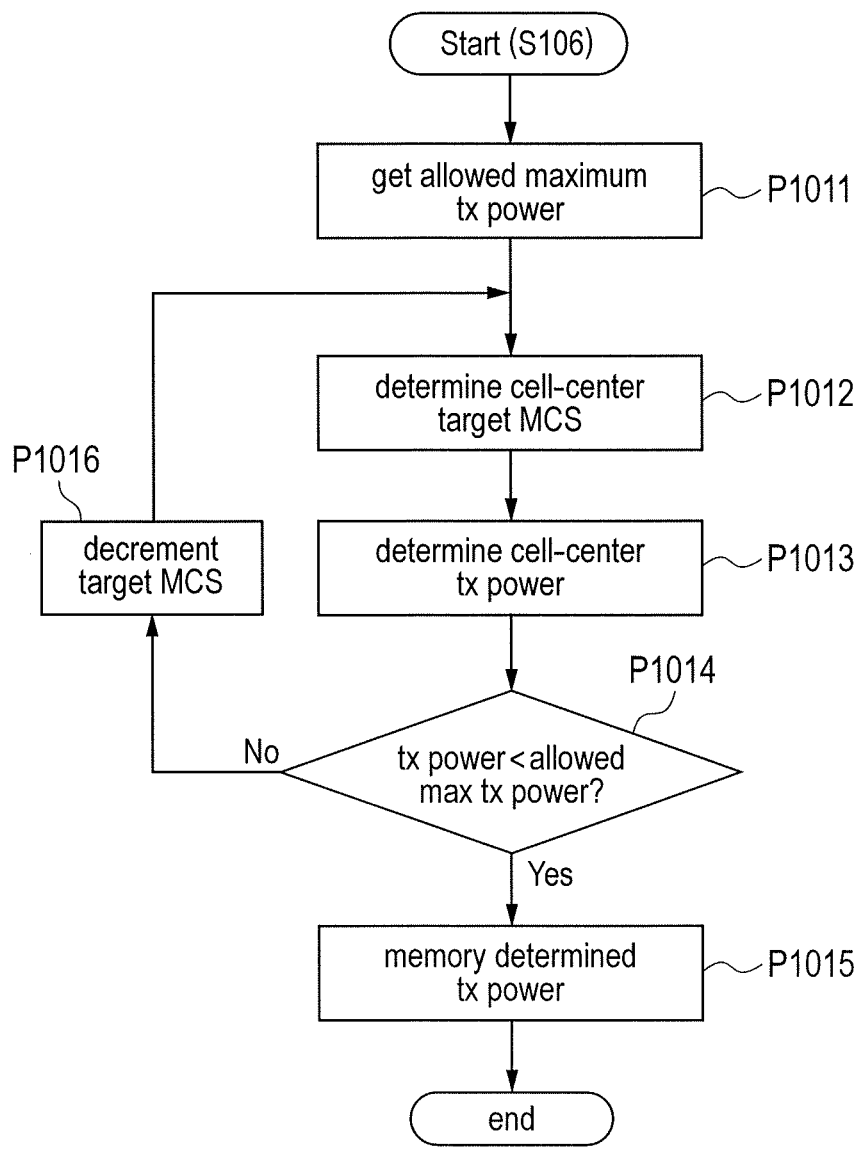
FIG. 7 is a drawing for describing the procedure for calculating the transmit power for the cell-center.
Figures 11, 12:
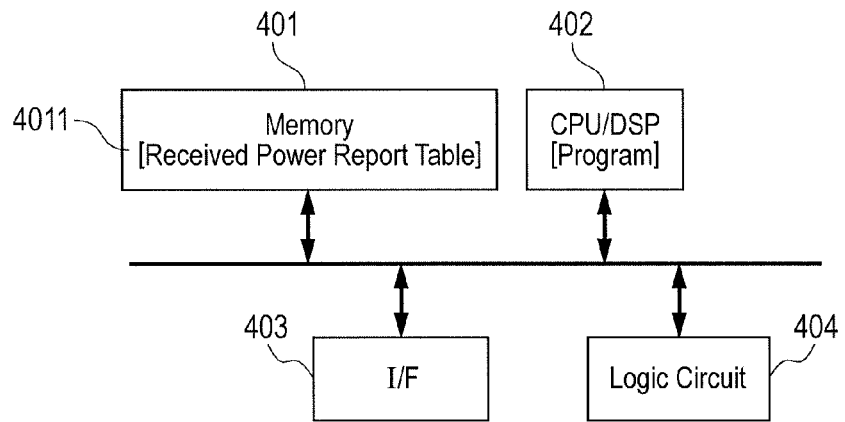
FIG. 11 is a drawing showing the hardware structure of the femtocell base station of the present invention.
FIG. 12 is a drawing for describing the MCS (modulation and coding) scheme.
Figure 13:
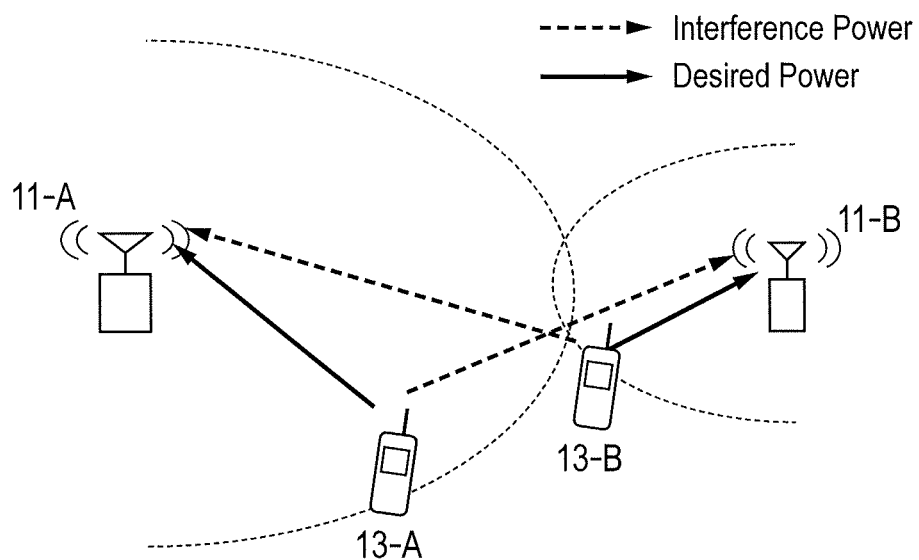
FIG. 13 is a drawing for describing the desired signal and interference signal in uplink communications.
Figure 14:
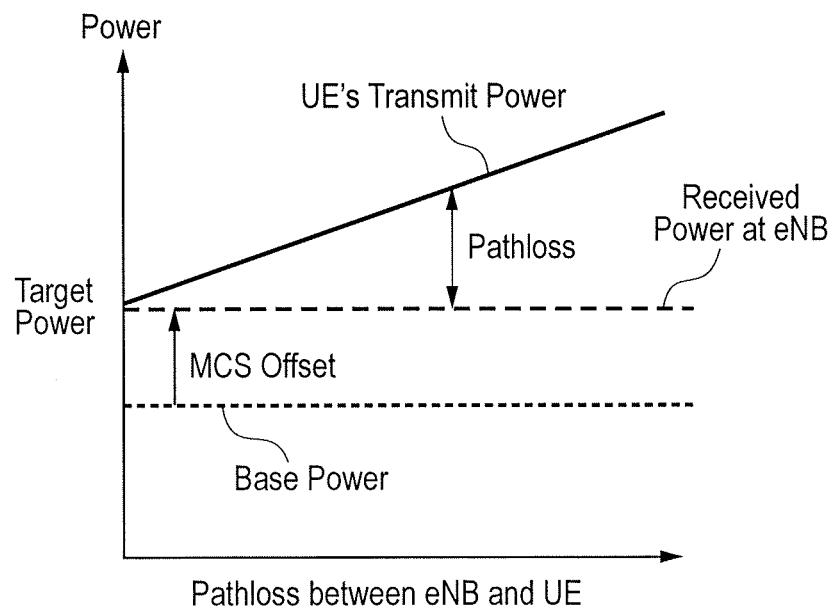
FIG. 14 is a drawing for describing the power control concept.

The step (P106) for calculating the transmit power of the cell-center terminal is described next using FIG. 7. Step P1011 is a process for loading the maximum allowed transmit power of the cell-center terminal that was calculated in P105. Step P1012 is a process for setting the target MCS of the cell-center terminal. The MCS as shown in FIG. 12 is the modulation method and code rate set and when the MCS is high (large MCS number) typically the modulation order is large and the code rate also high. In other words setting a high MCS requires attaining a high quality channel so that the required power must also be high. The figures shown in FIG. 12 are only examples and do not limit the embodiments. A high value must first of all be selected for the MCS of the cell-center terminal in order to achieve a high throughput for the femtocell base station.

In step P1013, the femtocell base station sets a power that matches the above MCS. The base station sets a transmit power that allows successful communication for example when using a target MCS (modulation and coding scheme) for setting the transmit power (P1013) of the cell-center terminal. Here, the transmit power can be calculated from the sum of the path loss between the cell-center terminals and the femtocell base station 1201-H, and the SNR (Signal to Noise Ratio) required for each modulation method, and the noise power in the femtocell base station 1201-H. An alternative method when calculating the transmit power using the SINR (Signal to Noise and Interference Ratio) is to also measure the index IoT (Interference over Thermal Noise) value for the arriving interference power in addition to the noise power as part of the measurement. This implies that the femtocell base stations measure IoT with a certain periodicity.

In P1014, the base station decides whether or not the transmit power calculated in P1013 is the same or lower than the maximum allowed transmit power obtained in P1011. If the decision is Yes, then the process proceeds to P1015 and if No the process proceeds to P1016. The decision may set unconditionally to Yes when the target MCS is already the minimum value. In P1015, the transmit power found in P1013 is stored as the cell-center terminal transmit power. The path loss between the cell-center terminal and the femtocell base station 1201-H may also be stored. The step P1016 may comprise a loop that lowers the target MCS to return to P1012 and repeats P1012 through P1014.

Figure 8:
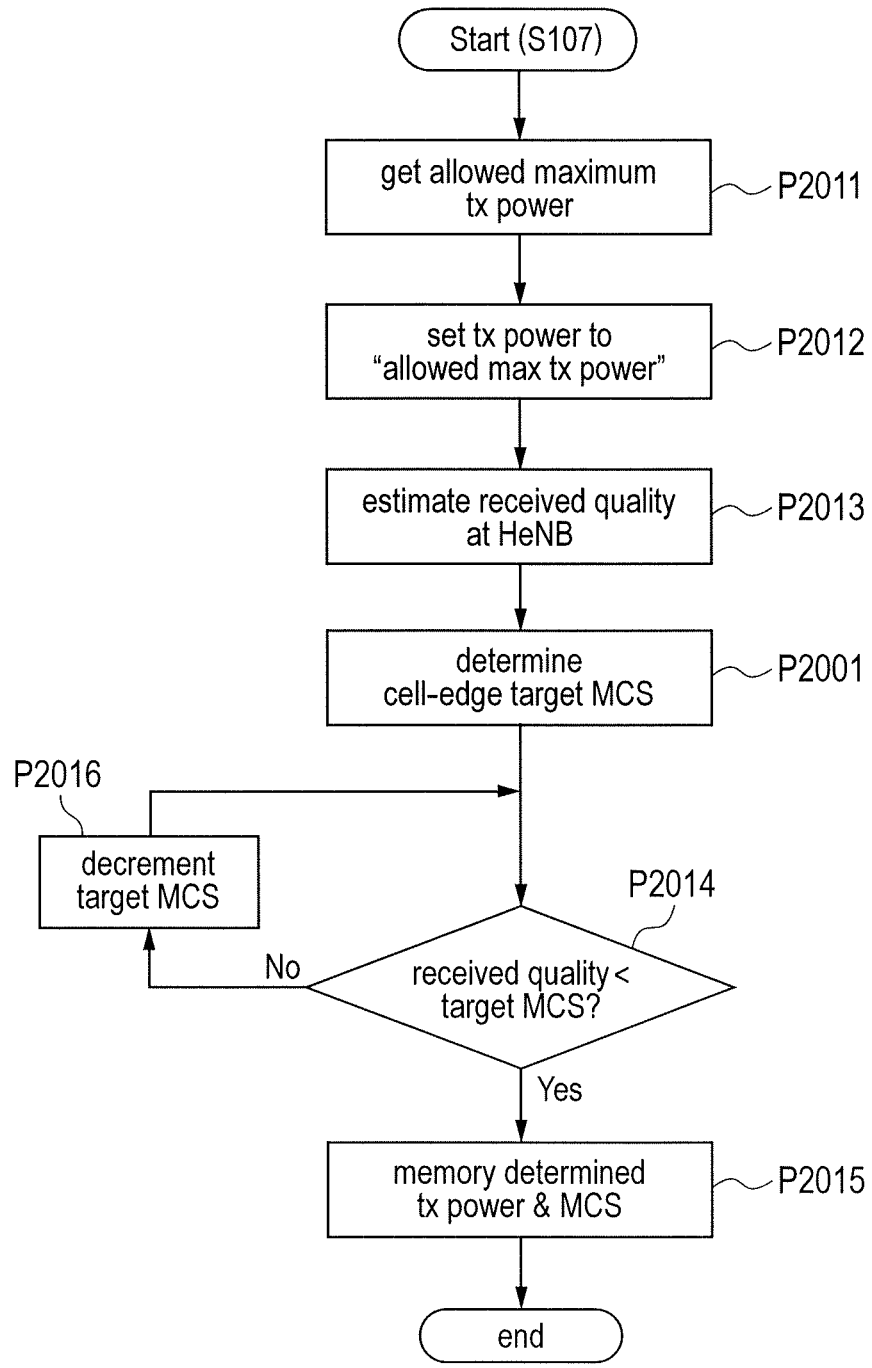
FIG. 8 is a drawing for describing the procedure for calculating the transmit power for the cell-edge.

The method for setting the transmit power of the cell-edge terminal in P107 is described next using FIG. 8. The step P2011 is the process for loading the maximum allowed transmit power of the cell-edge terminal the same as in P1011. In P2012, the femtocell base station 1201-H set the transmit power of the cell-edge terminal in the maximum allowed transmit power acquired in P2011. In P2013, the femtocell base station 1201-H execute a process for estimating the received power quality at the femtocell base station 1201-H when the cell-edge terminal sent a transmission at the maximum allowed transmit power. The uplink quality from the cell-edge terminal is found by subtracting the path loss between the femtocell base station 1201-H and the terminals 1023-H from the maximum allowed transmit power. Since the path loss during the downlink is considered the same as in the uplink, the femtocell base station 1201-H executes a process for calculating the downlink path loss. The downlink path loss may be found from the difference between the received power from the femtocell base station 1201-H that received the path loss reported by the cell edge terminal in the received power report table 4011 (FIG. 4) and the transmit power of the femtocell base station 1201-H. The downlink path loss may alternatively be found from the MCS of the downlink transmission that was set for the terminal 1203-H. In other words, the downlink path loss may be found by adding the differential between the femtocell base station 1201-H transmit power and maximum allowed transmit power, to the power requirements of the MCS used in downlink communication. The femtocell base station can moreover set the target MCS of the cell-edge terminal, and for example first of all select a high value for the MCS.

In step P2014, a decision is made whether the estimated received power quality satisfies the quality required for successful communications with the target MCS. The quality for successful communication with the target MCS can be preset and stored for each target MCS. The received quality may for example be set as SNR or as SINR. Moreover, a high target MCS value in an obtainable range may be selected to achieve high throughput. If the estimated received power quality satisfies the above conditions then the process can proceed to P2015. If the received power quality fails to meet the conditions then the process proceeds to P2016. In P2015, the femtocell base station stores the transmit power along with the above target MCS. The path loss between the cell-edge terminal and the femtocell base station 1201-H may also be stored. In P2016, the femtocell base station lowers the target MCS and adjusts the received power quality to a quality required for the target MCS.

Figure 9:
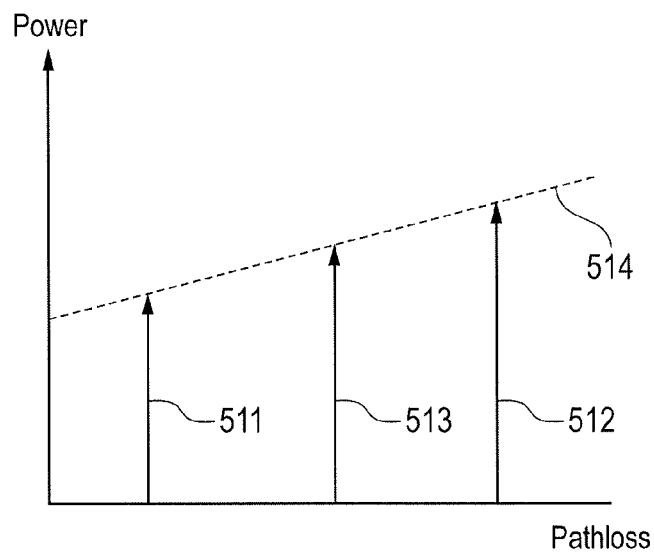
FIG. 9 is a drawing for describing the method for calculating the power of terminals other than the cell-center and cell-edge terminals.

Here, P108 is a step for determining the common parameters for all terminals within the cell from the transmit power of the cell-center terminal, and the transmit power of the cell-edge terminal. The transmit power 511 of the cell-center terminal and the transmit power 512 of the edge terminal are subjected to linear interpolation for path loss as shown in FIG. 9 (514) in order to calculate the transmit power 513 of the other terminals. A power control parameter (e.g., a parameter equivalent to the slope or intercept) is set for finding the transmit power from this linearly interpolated formula. The femtocell base station 1201-H may notify all terminals under its control of this common power control parameter.

The power control parameter found in the above process is reported to the terminals. The parameter notification to all terminals may be sent via a report or notification wireless (radio) channel. If the reported power control parameter has been changed from the previously used parameter then the terminals 1203-H updates the power control parameter and reconfigures the connection.

Each of the terminals 1203-H belonging to the femtocell base station 1201-H, controls the path loss between its own terminal and the femtocell base station 1201-H, and the transmit power based on the reported power control parameter.

Figure 10:
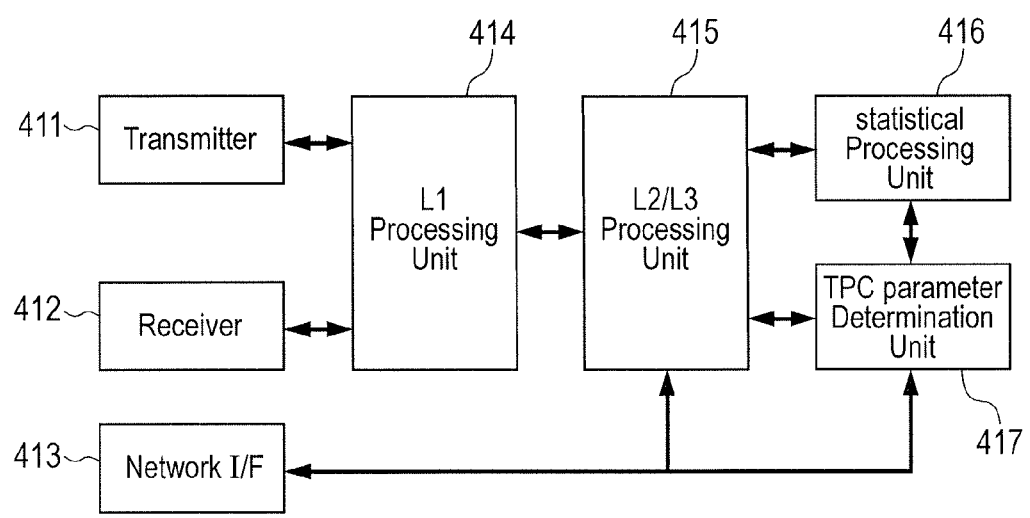
FIG. 10 is a function block diagram of the femtocell base station of the present invention.

FIG. 10 shows a function block diagram of the femtocell base station of this embodiment. A transmitter 411 is a block utilized by the femtocell base station 1201-H for sending downlink signals to the terminals 1203-H. A process for converting the downlink signal from a baseband signal to an RF (radio frequency) signal may also be included here. The transmitter 411 also contains a transmit antenna for sending radio waves. A receiver 412 is a block for allowing the femtocell base station 1201-H to receive uplink signals from the terminal 1203-H. A process for converting the uplink signal from an RF signal to a baseband signal may also be included here. The receiver 412 also contains a receive antenna for receiving radio waves. A common antenna that both receives and transmits radio waves may also be used. A network I/F (network interface) 413 is a block serving as an interface for coupling the femtocell base station 1201-H to the core network 1202 by way of the backhaul lines. The coupling via the core network 1202 provides mobile communication functions including information exchange between base stations, mobility management, communication with OAM devices, data transmission and receiving of data required by the terminals 1203-H and voice calls, etc.

The L1 processing unit 414 is a unit for allowing the femtocell base station 1201-H to perform signal processing in the physical layers. The main processing tasks for transmitting include FFT (Fast Fourier Transform), or adaptive modulation, error correction coding, layer mapping and precoding processing called MIMO (Multiple Input Multiple Output) signal processing. Main processing tasks for receiving are demodulation or decoding for removing the modulation or coding processing applied on the transmitting side. Data for transmission to the terminals is obtained from the L2/L3 processing unit 415, and data obtained from the terminals is sent to the L2/L3 processing unit 415. In addition to functions such as HARQ (Hybrid Automatic Repeat request) management, scheduling processing to set the interrupt (break-in) resource, packet forming, wireless line concealment, and generation of signaling information to the terminal, the L2/L3 processing unit 415 is also a block including radio resource management functions such as cell interference control.

The statistical information processing unit 416 is a block that performs statistical processing to acquire information needed for executing the processing in this embodiment. The received power report table 4011 (FIG. 4) stores the information generated in this block. This received power report table 4011 may also be applied to finding the distribution of terminals 1203-H within the cell and the positional relationships with each base station, and for calculating each type of path loss. The TPC parameter determination unit 417 is a block for executing the processing in the sequence for P104 through P108 (FIG. 2) in the embodiment. The TPC parameter determination unit 417 operation is linked to the statistical processing unit 416 in order to search information in the received power report table 4011 (FIG. 4) acquired by the statistical information processing unit 416. Allowed power information and power information for calculating the path loss may be acquired through information exchange between base stations or the OAM device by way of the network I/F 413.

FIG. 11 is a drawing showing the hardware structure of the femtocell base station 1201-H of the present embodiment. The memory unit 401 stores the received power report table 4011 as shown in FIG. 4. The CPU-DSP unit 402 may for example be comprised of a program to execute P103 through P108 as the unique processing of this embodiment. The logic circuit 404 is a section that supports program functions executed by the CPU-DSP unit 402. The I/F 403 is a collective name for the interface with the wireless antenna and the interface with the backhaul line, etc.

The method disclosed in this embodiment is capable of adequately lowering the interference applied to the macrocell base station 1201-M to ensure communication quality with the femtocell base station 1201-H by setting the transmit power of the cell-edge terminal within the range of the allowed interference power. The method of the embodiment can also provide high speed communication quality to the cell-center terminal. After setting the transmit power for the cell-center terminal and the cell-edge terminal, this method sets the transmit power for other terminals by linear interpolation of both (cell-center and cell-edge) terminals.

In Japanese Unexamined Patent Application Publication (Translation of PCT Application) No. 2010-516184, the terminal 1203-H adjusts the maximum target MCS after measuring the downlink receive power from the femtocell base station 1201-H, and the downlink receive power from the macrocell base station 1201-M. Uplink interference will be suppressed only when all terminals posses the processing disclosed in Japanese Unexamined Patent Application Publication (Translation of PCT Application) No. 2010-516184.

In contrast, in the method of the present embodiment, the femtocell base station 1201-H adjusts the target MCS rather than the terminals, by methods such as in P105, P106. By uniformly controlling the power applied to all terminals under its control, the femtocell base station 1201-H can control the uplink interference applied to the other base stations without omissions.

In the technology disclosed in Japanese Unexamined Patent Application Publication (Translation of PCT Application) No. 2010-512680, the total allowed interference power applied to the macrocell base stations as interference is subdivided among all the terminals. The method in Japanese Unexamined Patent Application Publication (Translation of PCT Application) No. 2010-512680 applies a limit to separate terminals so the interference power applied to the macrocell base station will be within a specified value at all terminals.

In contrast, in the scheme of the present embodiment, the base stations collectively set the power control parameters jointly used by all terminals, so that all terminals 1203-H within the cell utilize a commonly applied allowed interference power not unique to each terminal.

Second Embodiment

The technique disclosed in the first embodiment is described next as a detailed method assuming usage is applied to LTE. The condition in P102 of FIG. 2 required for the terminal 1203-H to perform measurement, may be set as a value in the initial setup in P101, and notification made by using an RRC message.

The measurement scheme utilizes a function for reporting the RSRP (Reference Signal Received Power) or RSRQ (Reference Signal Received Power) or RSRQ (Reference Signal Received Quality). Reporting the RSRQ allows reporting in a format that is a power ratio of the RSSI (Received Signal Strength Indication) including the interference power of the reference signals from the other cells, and the received signal of its own cell. The report may be in the form of either the RSRP or the RSRQ, or a collection of both. However, usually one of these formats is used due to the possibility that numerous configuration rewrites will occur, and a training period then set, and other markers (indicators) collected just within that time. The training period may be triggered periodically or manually via OAM devices.

In P103, femtocell base station 1201-H manages the RSRP and RSRQ respectively via the received power report value control table 4011. The terminal 1203-H performs normalizing each time a report value is generated, so the femtocell base station 1201-H that received the report may manage just the instantaneous value. The femtocell base station 1201-H may also incorporate the reporting frequency (or rate) when using statistics to manage the RSRP and RSRQ. Control can also be achieved according to the terminal distribution by recording the value from the report value in combination with the frequency (rate) over a long period of time. If the femtocell base station 1201-H was for example installed within a home then the terminal 1203-H is seldom exposed to large changes in the fading environment. On the other hand, if moved from one room to another then the received power distribution is likely to change due to effects from the walls. While stationary within a room, the terminal 1203-H returns a report value containing a fixed receive power to the femtocell base station 1201-H. The femtocell base station 1201-H is in other words capable of decided at what position the terminal 1203-H is stationary or stopped from the count obtained from the returned report values.

Since the power report value with the largest reporting frequency or rate indicates the position where the terminal 1203-H is most often stopped or stationary, that value may be set as a general indicator of power at the cell-center. Conversely, a power report value whose reporting count (frequency) never reaches a specified count can be judged as a location where the terminal 1203-H is almost never present.

In view of the above circumstances, forming an evaluation function may prove advisable to reflect the above information when selecting the cell-center terminal and the cell-edge terminal. When selecting a cell-center terminal and cell-edge terminal for example, an evaluation function can be generated by utilizing a forgetting average, and then after reducing the forgetting factor, continuously acquiring the average value from the report value spanning a long time period. The calculation can also be made during cell-center and cell-edge terminal selection by excluding report value figures that are lower than a specified value. Even if there are no actual cell-center and cell-edge terminals, one can assume the presence of terminals able to return report value results where a forgetting average was acquired.

In P104, a more accurate power setting can be provided for selecting a cell-center terminal and cell-edge terminal by utilizing a value that takes into account the reporting frequency rather than a value utilizing a simple average of the reported power values. Besides the above RSRP/RSRQ reporting values, the CQI (Channel Quality Indication) Report is another method for reporting the downlink communication quality from the femtocell base station. The CQI value may be set as one method for selecting the cell-center terminal and cell-edge terminal.

Power control parameters such as for expressing linear interpolation formulas also including other terminals may be set in P108 based on the power of the cell-center terminal and cell-edge terminal. The power control formula for LTE joint traffic channels for example may be expressed by writing as follows.

$$P_{PUSCH}(i) = \min\{P_{MAX}, 10 \log_{10}(M_{PUSCH}(i)) + P_{0\_PUSCH} + \alpha \cdot PL + \Delta_{TF}(i) + f(i)\} \quad \text{[Formula 2]}$$

The left side of the formula is equivalent to the cell-edge and cell-center terminal power. The $\Delta_{TF}$ and $f(i)$ are adjustment components for use during communication and can therefore be ignored. The $M_{PUSCH}(i)$ may be considered a given value of the OFDMA resource, and viewed as a specific value for use during power control. This formula can be expressed as a linearly interpolated formula by setting the coefficient ($\alpha$) by which to multiply the path loss and the reference (base) power ($P_{0\_PUSCH}$). These ($\alpha$) and ($P_{0\_PUSCH}$) values can be calculated by applying the above formula respectively for the cell-edge terminal and cell-center terminal and solving the system of equations. The coefficient ($\alpha$) is a coefficient for compensating for path loss, and is the dominant parameter for all terminals. Control can of course also be achieved based on the same approach for other than joint traffic channel power control.

The method disclosed in this embodiment is capable of setting the transmit power of the cell-edge terminal to the allowed interference power in LTE systems, and lowering the interference applied to the macrocell base station 1201-M, and ensuring the communication quality to the femtocell base station 1201-H.

Third Embodiment

The first embodiment deals with the case in P107 where the maximum allowed transmit power of the cell-edge terminal is small. If the maximum allowed transmit power is small, then the estimated communication quality at the femtocell base station 1201-H will sometimes be worse than expected.

In this case, the problem can be resolved by implementing control linked to the cell-edge terminal scheduling method to lower the power density, or by increasing the allocation resources. In base stations such as femtocells that accommodate few individuals, allocating a large quantity of resources is an easy to employ avoidance method.

In wireless communication systems such as LTE for example, resources can be allocated along the time axis and along the frequency axis. The OFDMA/SC-FDMA schemes are multiplexing methods for allocating terminals to each resource.

When increasing resource allocation along the frequency axis, lowering the power density on each resource and increasing the number of allocated resources will prove effective in dispersing interference.

Increasing the resource allocation along the time axis is another method. Another method sends the same data over consecutive frame times to obtain the advantage of repetition gain. This method is equivalent to dispersing interference along the time axis. In LTE for example, a technique called TTI bundling is available. The TTI bundling technique sends data for one sub frame over four sub frames to obtain repetition gain. TTL bundling can be actively applied to the cell-edge terminals in this invention to lower the power density.

This embodiment renders the effect of dispersing interference by lowering the interference power density per the wireless resource. Dispersing the interference serves to lower the effects of interference on the terminals in the macrocell base station.

Fourth Embodiment

This embodiment provides a method for selecting the cell-center terminal and cell-edge terminal that provides a large change in performance in power control performance. In cases where applied to femtocell base stations, the installation is often indoors so that penetration loss due to the walls or ceilings of the first and second floor of the building becomes a major problem that must be taken into account.

A differential to an extent of 10 to 30 dB is prone to occur in path loss between the femtocell base station 1201-H and the terminal 1203-H due to penetration loss. On the other hand, there is sometimes no differential in the path loss among terminals connected to the macrocell base station 1201-M, and to the femtocell base station 1201-H. In other words, only the absolute value for path loss between the macrocell base station 1201-M and the terminal need be taken into account regardless of whether the connected to the femtocell base station 1201-H is the cell-center or cell-edge terminal. If the path loss is the same or higher than a specified value (large attenuation) then only the path loss between the femtocell base station 1201-H and terminals 1203-H need be compensated. If the path loss is the same or lower than a specified value then control may be implemented as shown in the first embodiment.

In the above case, if a check of the path loss distribution (e.g., an offset or indicator expressing variations) between the femtocell base station 1201-H and the terminal 1203-H is the same or larger than a specified value then an MCS can be set that is used within the range of the maximum allowed transmit power after taking the interference power applied to the macrocell base station 1201-M into account. Conversely, if the path loss distribution is within a specified quantity then the power of the cell-center terminal may be utilized unchanged by the cell-edge terminal without calculating the interference power applied to the macrocell base station 1201-M.

The present embodiment allows skipping the process for selecting a cell-center terminal and cell-edge terminal by finding the path loss distribution of terminals within the femtocell base station 1201-H, and then deciding to what extent to limit the specified path loss distribution.

A typical application for the present invention for example is the femtocell base station. By implementing uplink power control that minimizes the applied interference, the present invention can limit effects on the currently utilized macrocell base station to a minimum level. The present invention can therefore be applied for example to small-sized base stations for use as a countermeasure in hotspots and blind areas where macrocell base stations were installed.

What is claimed is:

1. A base station for a cellular wireless communication system comprising a plurality of base stations and a plurality of terminals to control a transmit power based on specified transmit power control parameters and a path loss during communication with the base station;

wherein the base station:

receives from each terminal, received power quality information of a downlink reference signal from the base station measured by the plural terminals, and received power quality information of a downlink reference signal from a neighboring cell base station adjacent to the base station;

selects a cell-center terminal and a cell-edge terminal from the plural terminals based on the received power quality information and a power report frequency over time;

selects the cell-center terminal based on a power report value with a largest power report frequency;

selects the cell-center terminal and the cell-edge terminal by excluding power report values that are lower than a specified value;

finds a first transmit power of the cell-center terminal based on an allowed interference power quantity preset in the neighboring cell base station, and a first path loss between the applicable neighboring cell base station and the cell-center terminal;

finds a second transmit power of the cell-edge terminal based on the allowed interference power quantity preset in the neighboring cell base station; and a second path loss between the applicable neighboring cell base station and the cell-edge terminal;

specifies the relation between path loss and transmit power by interpolating the first path loss and the first transmit power of the cell-center terminal, and the second path loss and the second transmit power of the cell-edge terminal, and also finds the transmit power control parameters utilized in controlling the transmit power in the cell-center and cell-edge terminals belonging to the base station; and notifies the terminals belonging to the base station of the transmit power control parameters that were found.

2. The base station according to claim 1, wherein to find and use the first transmit power, the base station:

finds the maximum allowed transmit power of the cell-center terminal based on the allowed interference power quantity preset in the neighboring cell base station, and the first path loss between the applicable neighboring cell base station and the cell-center terminal;

selects a target MCS transmit power required for successful communication at the modulation method and code rate shown by the specified target MCS, that is lower than the maximum allowed transmit power found for the cell-center terminal, and sets the first transmit power within a range of the maximum allowed transmit power and the transmit power required for successful communication at the modulation method and code rate indicated by the selected target MCS.

3. The base station according to claim 1, wherein, the base station finds the maximum allowed transmit power of the cell-edge terminal based on the allowed interference power quantity preset in the neighboring cell base station, and the second path loss between the applicable neighboring cell base station and the cell-edge terminal; and sets that maximum allowed transmit power of the applicable cell-edge terminal as the second transmit power of the cell-edge terminal.

4. The base station according to claim 1, wherein the base station:

finds the received power quality of the base station from the maximum allowed transmit power found for the cell-edge terminal;

selects a target MCS such that the received power quality found for the base station satisfies the received power quality required for successful communication at the modulation method and code rate indicated by the specified target MCS, and stores the selected target MCS and the second transmit power.

5. The base station according to claim 1, wherein during selection of the cell-center terminal and the cell-edge terminal, the base station utilizes the history of the received power quality information that was received to assign a ranking by way of the receive rate.

6. The base station according to claim 1, wherein the base station:

linearly interpolates the first transmit power of the cell-center terminal and the first path loss, and the second transmit power of the cell-edge terminal and the second path loss.

7. The base station according to claim 6, wherein the transmit power control parameter found by linear interpolation is the coefficient α by which to multiply the path loss and the reference (base) power P0_PUSCH in the power control formula specified in the LTE standards.

8. The base station according to claim 1, wherein scheduling is utilized to increase the number of allocated resources to lower the power density during communication with the cell-edge terminal at the maximum allowed transmit power.

9. The base station according to claim 8, wherein the resource whose allocation is increased is the frequency axis resource.

10. The base station according to claim 8, wherein the resource whose allocation is increased is the time axis resource.

11. The base station according to claim 1, wherein the cell serving as the communication area for the base station is smaller than the cell serving as the communication area for the neighboring cell base station.

12. The base station according to claim 1, wherein the received quality information is shown as the receive power of the downlink reference signal.

13. The base station according to claim 1, wherein the base station finds:

the first path loss by acquiring the preset transmit power at which the neighboring cell base station transmits, and finds the differential between the applicable transmit power, and the received power quality information of the downlink reference signal from the neighboring cell base station received from the cell-center terminal; and finds the second path loss by acquiring the preset transmit power at which the neighboring cell base station transmits, and finds the differential between the applicable transmit power, received power quality information of the downlink reference signal from the neighboring cell base station received from the cell-edge terminal.

14. A cellular wireless communication system comprising a first base station to communicate with plural terminals, and a second base station adjacent to the first base station, that controls a transmit power based on specified transmit power control parameters and a path loss between the first base station and the terminals during communication, wherein the first base station:

receives from each terminal, received power quality information of a downlink reference signal from the first base station, and received power quality information of a downlink reference signal from a second base station adjacent to the first base station measured by the plural terminals;

selects a cell-center terminal and a cell-edge terminal from the plural terminals based on the received power quality information and a power report frequency over time;

selects the cell-center terminal based on a power report value with a largest power report frequency;

selects the cell-center terminal and the cell-edge terminal by excluding power report values that are lower than a specified value;

finds a first transmit power of the cell-center terminal based on an allowed interference power quantity preset in the second base station, and a first path loss between the second base station and the cell-center terminal;

finds a second transmit power of the cell-edge terminal based on the allowed interference power quantity preset in the second base station; and a second path loss between the second base station and the cell-edge terminal;

specifies the relation between path loss and transmit power by interpolating the first path loss and the first transmit power of the cell-center terminal, and the second path loss and the second transmit power of the cell-edge terminal, and also finds the transmit power control parameters utilized in controlling the transmit power in the cell-center and cell-edge terminals belonging to the first base station; and notifies the terminals belonging to the first base station of the transmit power control parameters that were found.

15. The cellular wireless communication system according to claim 14,
wherein the first base station is a femtocell base station, and
wherein the second base station is a macrocell base station.

* * * * *